(12) United States Patent
Umeda

(10) Patent No.: US 8,960,413 B2
(45) Date of Patent: Feb. 24, 2015

(54) ARTICLE CONVEYER BELT AND COIN SORTING DEVICE

(71) Applicant: Asahi Seiko Kabushiki Kaisha, Tokyo (JP)

(72) Inventor: Masayoshi Umeda, Saitama (JP)

(73) Assignee: Asahi Seiko Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/299,842

(22) Filed: Jun. 9, 2014

(65) Prior Publication Data

US 2014/0332350 A1 Nov. 13, 2014

Related U.S. Application Data

(62) Division of application No. 13/748,473, filed on Jan. 23, 2013, now Pat. No. 8,776,993.

(30) Foreign Application Priority Data

Jan. 25, 2012 (JP) ................. 2012-013283

(51) Int. Cl.
*B65G 19/24* (2006.01)
*B65G 15/58* (2006.01)
(Continued)

(52) U.S. Cl.
CPC ............. *B65G 15/58* (2013.01); *B65G 47/46* (2013.01); *B65G 15/30* (2013.01); *B65G 19/245* (2013.01); *G07D 9/008* (2013.01); *B65G 15/44* (2013.01)
USPC ............. 198/698; 198/370.02; 198/370.09; 198/469.1; 198/728; 198/731; 198/890

(58) Field of Classification Search
USPC ............. 198/370.01, 370.02, 370.08, 370.09, 198/370.1, 469.1, 474.1, 717, 725, 728, 198/729, 731, 733, 698, 890, 890.1
See application file for complete search history.

(56) References Cited

U.S. PATENT DOCUMENTS

| 4,143,759 A | 3/1979 | Paradis |
| 6,216,849 B1 | 4/2001 | Sytema |

(Continued)

FOREIGN PATENT DOCUMENTS

| EP | 2 216 274 | 8/2010 |
| GB | 2 436 550 | 10/2007 |

(Continued)

OTHER PUBLICATIONS

European Application No. 12193105.9 Extended European Search Report, dated Apr. 8, 2013, 3 pages.

(Continued)

*Primary Examiner* — Leslie A Nicholson, III

(57) ABSTRACT

An article conveyer belt assembly used for example, in a coin sorting device for positively pushing an article, such as a coin along a support surface is provided. A toothed belt has teeth for transmission of power by mounting a plurality of pushers on the belt with a connector removably mounted with a connecting body, a first holder and a second holder spaced a distance from each other to hold onto the conveyor belt. One of the first and second holders has a hook member to close a spaced opening at one end. The first and second holders are cantilevered to be mounted on a conveyor belt. At the other end of the connector body a pusher unit has a first shaft part and a second shaft part cantilevered from the connector body, with a hollow roller snap fitted on the first shaft part and the second shaft part.

7 Claims, 11 Drawing Sheets

(51) Int. Cl.
  *B65G 47/46* (2006.01)
  *B65G 15/30* (2006.01)
  *G07D 9/00* (2006.01)
  *B65G 15/44* (2006.01)

(56) References Cited

U.S. PATENT DOCUMENTS

| | | |
|---|---|---|
| 6,471,041 B1 | 10/2002 | Long et al. |
| 6,951,271 B2 | 10/2005 | Simpson et al. |
| 7,172,194 B2 | 2/2007 | Terao et al. |
| 8,365,900 B2 | 2/2013 | Monti |
| 8,567,593 B2 | 10/2013 | Nakamura et al. |
| 2002/0142875 A1 | 10/2002 | Rosenberger |

FOREIGN PATENT DOCUMENTS

| | | |
|---|---|---|
| JP | 3588480 | 11/2004 |
| JP | 3725720 | 12/2005 |
| JP | 4313409 | 8/2009 |
| JP | 2010006563 | 1/2010 |

OTHER PUBLICATIONS

European Application No. 13174971.5 Extended European Search Report, dated Sep. 5, 2013, 3 pages.

ARTICLE CONVEYER BELT AND COIN SORTING DEVICE

CROSS-REFERENCE TO RELATED APPLICATION

The present application is a divisional application from U.S. patent application Ser. No. 13/748,473 filed on Jan. 23, 2013. The present application claims priority from Japanese Application No.: JP 2012-013283 filed on Jan. 25, 2012.

BACKGROUND OF THE INVENTION

1. Field of the Invention

The present invention relates to an article conveyor belt for conveying an article by pushing the article in a predetermined direction to a predetermined position. In particular, the present invention relates to an article conveyor belt suitable for conveying a light-weight article, such as a monetary coin, to a predetermined direction by pushing, whose manufacturability and maintainability is cost effective. Furthermore, the present invention relates to a coin sorting device using the article conveyor belt.

2. Description of Related Art

As a first prior art, a coin conveyor belt in which a toothed surface, including a plurality of tooth parts that engage with a pulley, are provided to a belt body is known, wherein each tooth part extends in a belt width direction with a space along a belt length direction. A large tooth part is provided at predetermined pitches among these tooth parts, the large tooth part having at least one of a tooth height dimension and a tooth length direction set larger than that of other tooth parts, and an engaging plate for engaging with a coin for conveyance when the belt is driven as provided on a side surface of this large tooth part (for example, refer to Japanese Patent No. 3588480).

As a second prior art, a coin conveyor belt is known, including a belt body provided with a plurality of hole portions penetrating through front and back surfaces along a coin conveying direction and is also provided at a plurality of positions in a belt width direction crossing the coin conveying direction. The coin conveyor belt also includes a plurality of projections each having a coin pushing part engaged with a front surface side of this belt body, an insertion part arranged inside a hole portion of the belt body, a holding part engaged with a back surface side of the belt body to hold the belt body with a coin pushing part, and a detent part for stopping any rotation with respect to the belt body. The projections are provided with an inclined surface on a side of the coin pushing part opposite to the coin conveying direction. The inclined surface being inclined from a belt body side of the coin pushing part toward a projection tip side of the coin pushing part, and the projections being allowed to be inserted into the hole portions of the belt body and engaged with the belt body, with the inclined surface part being positioned on the side opposite to the coin conveying direction of the coin pushing part (for example, refer to Japanese Patent No. 3725720).

As a third prior art, a coin conveyor belt is known having a toothed surface including a plurality of tooth parts engaging with a pulley being provided on a thermosetting urethane-made belt body, each of the tooth parts being spaced apart in a belt length direction and extending in a belt width direction. A large tooth part is provided with every predetermined pitch among the tooth parts, the large tooth part with at least one of a tooth height dimension and a tooth length dimension being set to be larger than that of the other tooth parts, and the belt, including an engaging plate, being provided on a side surface of this large tooth part. The engaging plate permits engaging and conveying a coin when the belt runs, wherein the engaging plate is formed in a push pin shape having a pin part. A pin hole is provided on the large tooth part to extend in its width direction, and the coin conveyor belt is mounted on the side surface of the large tooth part with the pin part of the engaging plate inserted in the pin hole, wherein t represents a thickness of a bottom part, H represents a tooth height from a pitch line, h represents a tooth height, R represents a root, and W represents a width among shape elements of the large tooth part. The coin conveyor belt has a shape satisfying the following relationships of $t \geq 0.6$ mm, $t/D \leq 0.034$ where D represents a back-surface idler pulley diameter, $H/D \leq 0.12$ and $h/D \leq 0.096$, and $W/D \leq 0.174$ and $R/D > 0.02$. For example, refer to Japanese Patent Application No. 20106563.

As a fourth prior art, a profile-equipped belt having belt teeth engaging with pulley teeth of a toothed pulley and having a profile mounted thereon is also known. The belt width is set wider than a length of the toothed pulley in a center axis direction and the profile includes a profile body with a projection piece projecting from a substrate in contact with a back surface side and a nail part formed integrally with the profile body and positioned on a tooth surface side to be engaged with a relevant belt tooth. A substrate is set to have a length covering a plurality of teeth and tooth grooves of the toothed belt so as to inhibit falling of the profile body and to be resistant to any reaction force received from an article to be conveyed and, by being curved in the belt width direction to be shrunk. A side edge part projecting from the toothed pulley across a belt width direction is inserted and held between the nail part and the substrate from inside within the belt width direction. (For example, refer to Japanese Patent No. 4313409).

SUMMARY OF THE INVENTION

In the first to third prior art, a toothed belt having teeth for transmission of a motive power formed on an inner surface side includes a tooth with a height different from those of the other teeth, is formed for each predetermined pitch and a base part of the pushers for an article is mounted on this tooth with a different height.

Therefore, since the toothed belt has a tooth with a height different from those of the other teeth, it is required to form a recessed part with a different height for every predetermined pitch on a toothed pulley around which the toothed belt is wound. In other words, such types of a toothed belt and a toothed pulley both have a special structure, which restricts the use and therefore increases cost, and therefore quick adoption to alternative sized articles is difficult.

In the fourth prior art, a tooth-side holder having a shape approximately fitting between the teeth at a predetermined position of the toothed belt and having uniform teeth is arranged on another non-tooth-side holder on a back side of the belt. The toothed belt is held by the tooth-side holder and the non-tooth-side holder for fixing, and an article is pushed by pushers integrally foamed with the tooth-side holder or the non-tooth-side holder for conveyance. Therefore, a normal toothed belt can be used, and thus the fourth prior art is excellent in cost.

However, since a main body configuring the toothed belt is made of synthetic rubber or synthetic fiber, expansion and degradation due to degradation with time are inevitable. In other words, replacement of the toothed belt is inevitable.

In the fourth prior art, a flat belt is deformed so as to have a substantially narrow width by being warped in a width direction between paired projection pieces formed in an inverted C shape, thereby mounting the pushers on the toothed belt. Therefore, while this technology can be adopted when the pushers are mounted on a toothed belt with a relatively wide width to, allow warping in a width direction, there is a problem in the case of a belt with a narrow width that is not able to be warped in a width direction so that the belt cannot be inserted between paired projection pieces. That is, it is unsuitable to move small devices in which a width of the toothed belt cannot be widened and the toothed belt has to be a substantially rigid body in the width direction.

To address this problem, when a toothed belt with a narrow width is used, a structure was considered by our inventor in which, a flat-plate substrate is pressed onto a back surface of the toothed belt with a narrow width and a holder pressed on a tooth side for a base part of the profile, and toothed-belt side end side parts of these substrate and holder are connected by connecting means. In this structure, however, there are problems in which the pushers are fixed to the toothed belt by the connecting means and therefore a special tool is required and the replacing operation is troublesome. To address this problem, it was considered that the entire belt with the pushers could be integrally formed, but replacing even a pusher still usable could not be quickly adopted in view of both resource saving and energy saving.

A first object of the present invention is to provide an article conveyor belt allowing pushers for pushing an article to be easily mounted on and removed from a toothed belt substantially without elasticity in a width direction in which the same teeth are formed with predetermined pitches.

A second object of the present invention is to provide a coin sorting device using an article conveyor belt allowing pushers for pushing an article to be easily mounted on and removed from a toothed belt substantially without elasticity in a width direction in which the same teeth are formed with predetermined pitches.

To achieve these objects, a first embodiment according to the present invention is configured as follows. In an article conveyor belt in which an article is pushed by pushers integrally provided on a toothed belt having teeth for transmission of motive power with predetermined pitches, the pushers, each have a mount part for mounting on the toothed belt and a pushing part for the article integrally formed on the mount part. The mount part is formed into a gate-like shape by a tooth-side holder positioned on a tooth side of the toothed belt and a non-tooth-side holder positioned on the non-tooth side. A connector connects on one side-edge side of the toothed belt, and has a hook formed at a tip of at least the tooth-side holder or the non-tooth-side holder to engage with an end edge on a non-connector side of the toothed belt.

A second embodiment is directed to an article conveyor belt wherein the tooth-side holder is formed as a trapezoidal shape approximately fitting in a trapezoidal pulley tooth receiving groove between the teeth formed at the predetermined pitches. The non-tooth-side holder is formed as a flat surface in close contact with a back surface of the toothed belt.

A third embodiment is directed to a coin sorting device in which an article conveyor belt, in which a coin is pushed to a predetermined direction along a guide rail by an article conveyor belt, has pushers integrally provided on a toothed belt. The toothed belt has teeth for transmission of motive power with predetermined pitches, each pusher has a mount part for mounting on the toothed belt and a pushing part, for engaging an article, integrally formed on this mount part. The mount part is formed in a gate-like shape by a tooth-side holder positioned on a tooth side of the toothed belt and a non-tooth-side holder or positioned on a non-tooth side. A connector connects these on one side-edge side of the toothed belt, and has a hook formed at a tip of at least the tooth-side holder or the non-tooth-side holder to engage with an end edge on a non-connector side of the toothed belt.

A fourth embodiment is directed to a coin sorting device, wherein the tooth-side holder is formed as a trapezoidal shape for approximately fitting in a trapezoidal pulley tooth receiving groove between teeth formed at predetermined pitches, and the non-tooth-side holder is formed as a flat surface in close contact with a back surface of the toothed belt.

A fifth embodiment is directed to a coin sorting device wherein the pushing part projects in parallel and in a reverse direction to the mount part.

A sixth embodiment is directed to a coin sorting device wherein the pushing part is configured with a shaft formed in a columnar shape and a metal-made roller rotatably supported by the shaft.

A seventh embodiment is directed to the coin sorting device wherein a shaft is formed in an approximately columnar shape by a first shaft part and a second shaft part having an arc peripheral surface with a slot formed from a free-end side toward an non-free-end side, and the roller is mounted by warping the first shaft part and the second shaft part.

Effect of the Invention

In the first embodiment, the tooth-side holder and the non-tooth-side holder are integrally formed by a connector to configure a gate-shaped mount part, and the hook is formed at a tip of at least either one of the tooth-side holder and the non-tooth-side holder to be closely engaged with a side end edge of the toothed belt. The pushing part is formed integrally with the mount part for pushing the article.

Therefore, with the tooth-side holder being inserted between the teeth formed with predetermined pitches, the movement of the mount part with respect to the toothed belt in a longitudinal direction is regulated. Also, with the connector being in close contact with the end edge of the toothed belt and the hook formed on the tooth-side holder or the non-tooth-side holder being engaged by the hook with the end edge of the belt on an opposite side, the movement of the toothed belt in a width direction can be regulated.

With the toothed belt held by the tooth-side holder or the non-tooth-side holder and the belt end edge being hooked by the hook, the article pushers can be mounted on the toothed belt so as not to easily fall off. At an appropriate time for removal or replacement, the service person can easily remove the hook from the toothed belt and pull out the tooth-side holder or the non-tooth-side holder. Thus, the present invention has an advantage of easy manufacture and maintenance.

In the second embodiment, the tooth-side holder is formed in a trapezoidal shape for approximately fitting into a trapezoidal pulley tooth receiving groove between the teeth, and the non-tooth-side holder is formed as a flat surface in close contact with a back surface of the toothed belt. Therefore, since the movement of tooth-side holder of the mount part in a forward and backward direction is restricted by the anterior and posterior teeth, no shift occurs in a longitudinal direction of the toothed belt. The present invention has an advantage in that the article to be conveyed can be conveyed without a positional shift.

In the third embodiment, the article conveyor belt is used in a coin sorting device. Therefore, the coin sorting device has an advantage of both easy manufacturing and easy maintenance of the coin conveyor belt.

In the fourth embodiment, the article conveyor belt of the second invention is used in a coin sorting device. Therefore, the coin sorting device has an advantage of both easy manufacture and easy maintenance of the coin conveyor belt. Furthermore, since a coin to be conveyed is not positionally shifted, the present invention has an advantage in that the coin can be conveyed accurately at a predetermined timing.

In the fifth embodiment, the pushing part projects in parallel and in a reverse direction to the mount part. Therefore, the present invention has an advantage of easy operation of mounting and removal of the mount part on and from the toothed belt.

In the sixth embodiment, the pushing part is configured with a shaft formed in a columnar shape and a metal-made roller is rotatably supported by the shaft. Therefore, since the article to be conveyed is in contact with the metal-made roller and, in the case of a sliding contact, the metal-made roller can rotate to avoid superfluous friction. Thus, the present invention has an advantage in that a coin can be more smoothly conveyed and high durability is achieved.

In the seventh embodiment, a shaft is formed in an approximately columnar shape by a first shaft part and a second shaft part, between which a slot is formed. Therefore, by warping the first shaft part and/or the second shaft part, an apparent diameter of the shaft part is reduced, and the roller can be mounted on the shaft part. In other words, since the roller can be mounted without using a tool, the present invention has an advantage of easy manufacture and maintenance.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

Figure 1:
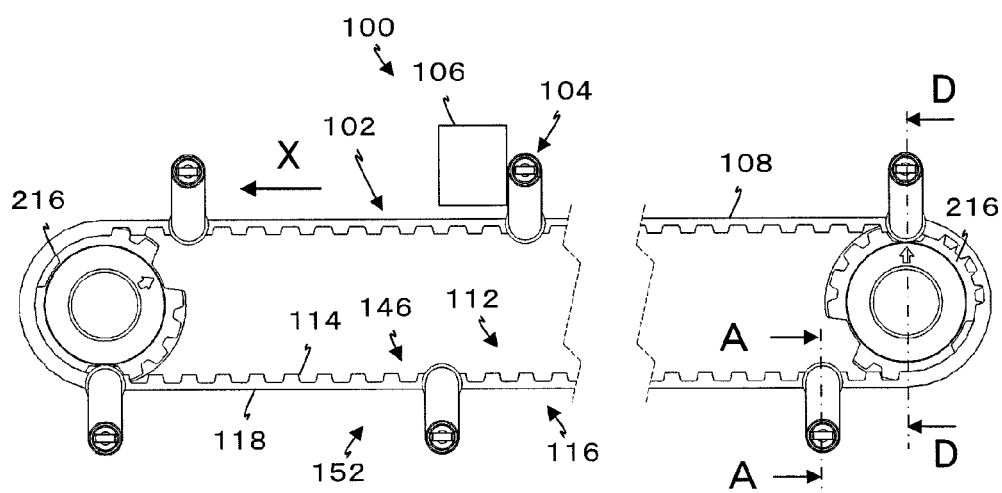
FIG. 1 is a front view of an article conveyor belt of a first embodiment according to the present invention being wound around a toothed pulley.

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims, where features in one embodiment can be incorporated into other embodiments. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures and components have not been described in detail as not to unnecessarily obscure aspects of the present invention.

The preferred mode of the present invention is directed to an article conveyor belt in which an article is pushed by pushers integrally provided on a toothed belt having teeth for transmission of motive power with predetermined pitches, the pushers each having a mount part for mounting on the toothed belt and a pushing part for the article integrally formed on this mount part. The mount part being formed in a gate shape by a tooth-side holder positioned on a tooth side of the toothed belt and an non-tooth-side holder positioned on a non-tooth side.

A connector connects the mount part on one side-edge side of the toothed belt, and has a hook formed at a tip of at least the tooth-side holder or the non-tooth-side holder to engage with an end edge on a non-connector side of the toothed belt. The tooth-side holder being formed as a trapezoidal shape approximately fitting in a trapezoidal pulley tooth receiving groove between the teeth formed at predetermined pitches, and the non-tooth-side holder being formed as a flat surface in close contact with a back surface of the toothed belt.

A coin sorting device can include an article conveyor belt in which a coin is pushed toward a predetermined direction along a guide rail by the article conveyor belt having pushers integrally provided on a toothed belt having teeth for transmission of motive power with predetermined pitches. Each pusher has a mount part for mounting on the toothed belt and a pushing part for contacting an article integrally formed on each mount part.

The mount part being formed in a gate shape by a tooth-side holder positioned on a tooth side of the toothed belt and a non-tooth-side holder positioned on a non-tooth side. A connector connecting the mount part on one side-edge side of the toothed belt, and having a hook formed at a tip of at least the tooth-side holder or the non-tooth-side holder to engage with an end edge on a non-connector side of the toothed belt. The tooth-side holder being formed as a trapezoidal shape approximately fitting in a trapezoidal pulley tooth receiving groove between the teeth formed at the predetermined pitches. The non-tooth-side holder being formed as a flat surface in close contact with a back surface of the toothed belt.

The pushing part projecting in parallel and in a reverse direction to the mount part, the pushing part being configured of a shaft formed in a columnar shape and a metal-made roller rotatably supported by the shaft. The shaft is formed in an approximately columnar shape by a first shaft part and a second shaft part having an arc peripheral surface with a slot formed from a free-end side toward a non-free-end side.

The roller being mounted by warping the first shaft part and the second shaft part during assembly.

A first embodiment is an example of an article conveyor belt 100 according to the present invention.

As depicted in FIG. 1, an article conveyor belt 100 according to the present invention has a function of pushing an article 106 in a predetermined direction (in FIG. 1, in an arrow X direction) by a pusher 104 integrally mounted on a toothed belt 102. That is, the article conveyor belt 100 is configured with the toothed belt 102 and the pusher 104 is configured separately and fixed to the toothed belt 102.

Figure 2:
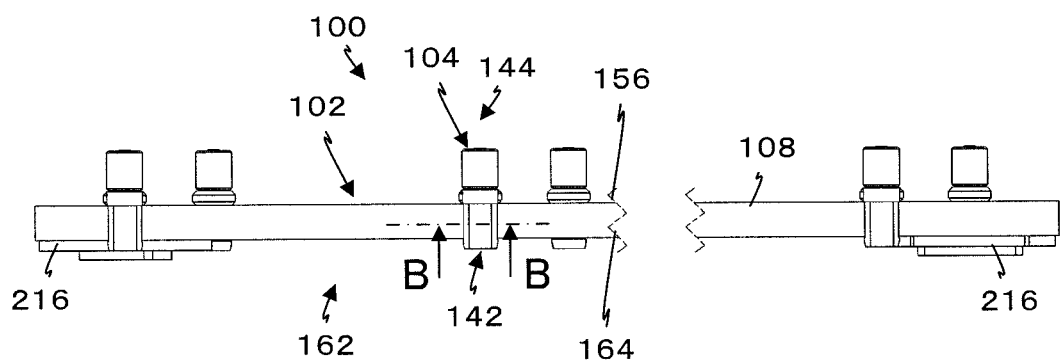
FIG. 2 is a plan view of the article conveyor belt of the first embodiment according to the present invention being wound around a toothed pulley.

First, the toothed belt 102 is described with reference mainly to FIGS. 1, 2, and 5. The toothed belt 102 in the present invention is a general commercially-available toothed belt (including both of a toothed belt standardized by specifications and a toothed belt manufactured as not being normalized with special dimensions) having each tooth 114 formed in the same trapezoidal shape at predetermined uniform pitches on an inner surface side 112 of a flexible ring-shaped belt 108 and having an outer surface side 116 with a flat back surface 118.

Figure 5:
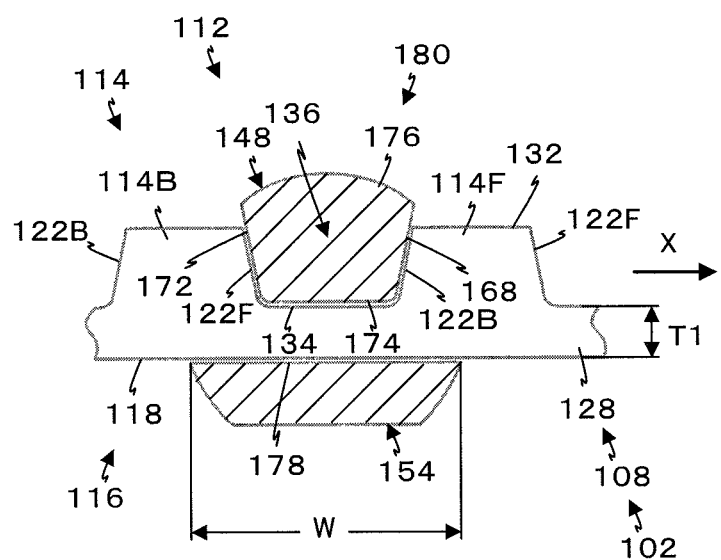
FIG. 5 is a B-B line sectional view in FIG. 2.

When the arrow X direction in FIG. 5 is taken as a travelling direction of the toothed belt 102 for convenience, than the tooth 114 has a front tooth face 122F positioned at a front portion in the travelling direction and a back tooth face 122B is tilted so as to come closer to each other at the same angle as they go away from a belt portion 128. The tips of each tooth 114 are connected to each other with a top face 132 formed in parallel with a back surface 118 to provide a cross sectional trapezoidal shape.

Therefore, a trapezoidal pulley tooth receiving groove 136 is formed between a front tooth 114F and a back tooth 114B. The pulley tooth receiving groove 136 has a space that is narrower as it comes closer to the belt portion 128 side because of the slanted angles of the back-side wall 112B of the front tooth 114 and the front tooth face 122F of the back tooth 114B, with their tips being connected with a bottom surface 134 formed in parallel with the back surface 118.

Figure 3A:
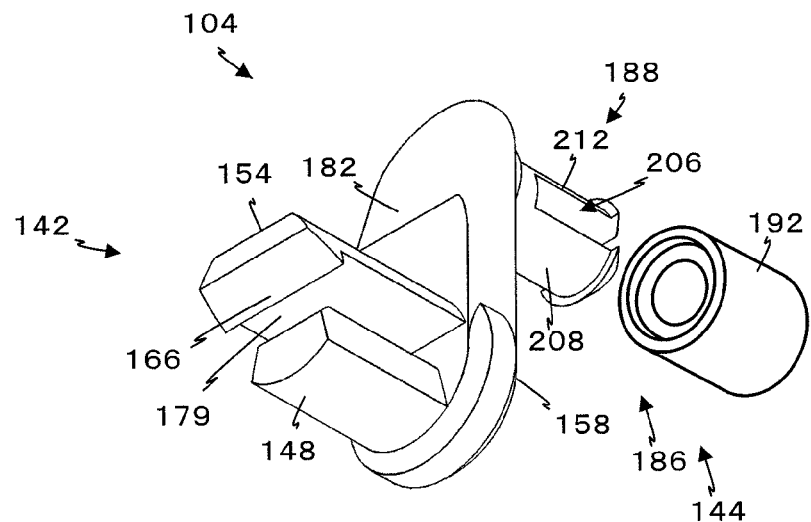
FIG. 3(A) and FIG. 3(B) depict perspective views of a pusher, which is a component of the article conveyor belt of the first embodiment according to the present invention, FIG. 3(A) being a perspective view from diagonally lower right and FIG. 3(B) being a perspective view from diagonally lower left.
Figure 3B:
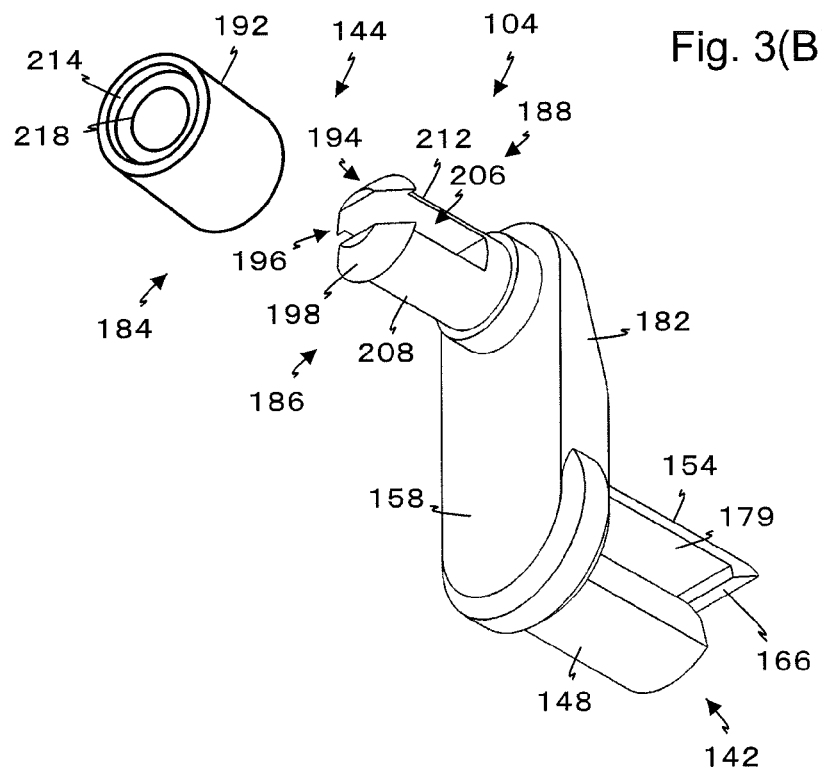

Next, the pusher 104 is described with reference mainly to FIGS. 3A and 3B. The pusher 104 is securely mounted on the toothed belt 102, and has a function of pushing the article 106 in a predetermined direction according to the movement of the toothed belt 102 in the predetermined direction. The pusher 104 has a mount part 142 for being inserted in (mounted on) the toothed belt 102 and a pushing part 144 integrated into this mount part 142 for pushing the article 106.

The pusher 104 is preferably integrally molded from resin, although the type of material is not to be considered restrictive. The use of a molded resin is to reduce cost and decrease weight. However, not only resin but also a metal can be used for fabrication. In the present embodiment, the pusher 104 is integrally molded from resin.

Next, the mount part 142 is described. The mount part 142 has a function of mounting the pusher 104 on the toothed belt 102 in a fixed state. The term fixed state refers to a state in which the substantial mount position on the toothed belt 102 is not changed. In other words, it is a state in which the toothed belt 102 and the mount part 142 are substantially integrated together in operation. See FIGS. 4 and 5.

The mount part 142 is formed in a laterally-oriented gate shape (a laterally-oriented channel shape) by a tooth-side holder 148 positioned on a tooth side 146 (an inner surface side 112) of the toothed belt 102, a non-tooth-side holder 154 positioned on the non-tooth side 152 (an outer surface side 116) thereof, and a connector 158 connecting these holders on one side-edge side 156 of the toothed belt 102. A hook 166 is formed at least at the tip of the tooth-side holder 148 or the non-tooth-side holder 154 and is configured to engage another side end edge 164 of the toothed belt 102 on a non-connector side 162.

Figure 6:
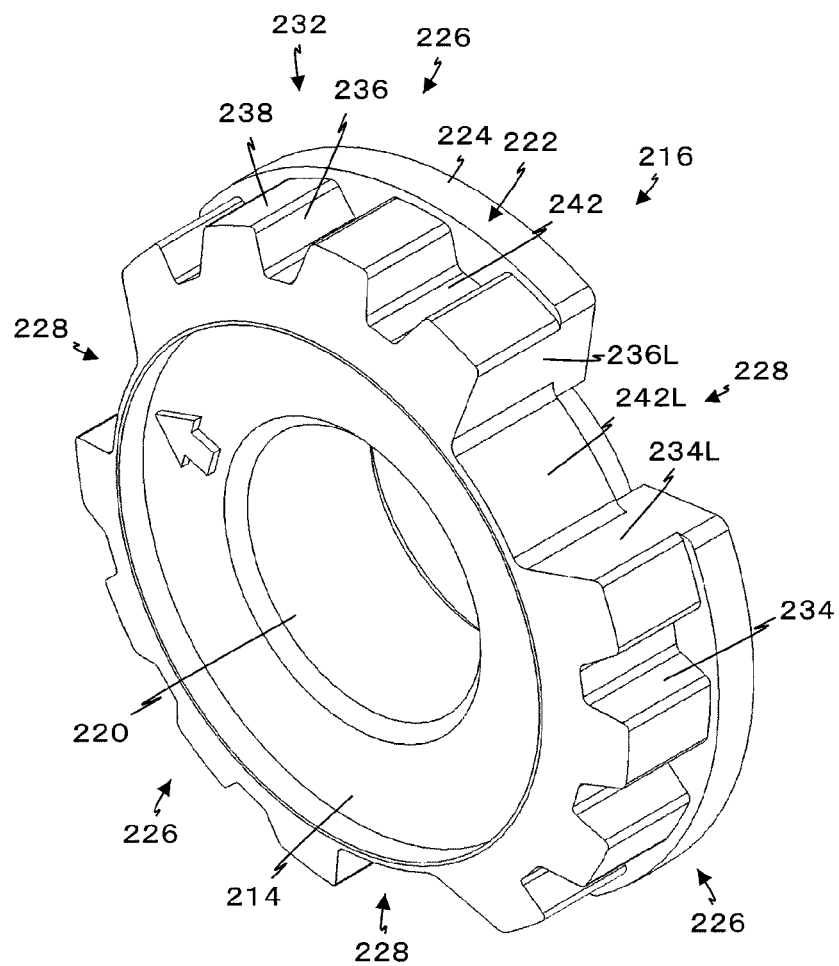
FIG. 6 is a perspective view of a toothed pulley for the article conveyor belt of the first embodiment according to the present invention when viewed from diagonally upper right.

First, the tooth-side holder 148 is described. The tooth-side holder 148 not only provides a tooth for engaging with a toothed pulley 216, See FIG. 6, but also functions to capture a toothed belt 102 with the non-toothed side holder 154. The tooth-side holder 148 is inserted between adjacent teeth 114 on the inner surface side 112 of the toothed belt 102, whereby a movement in an extending direction of the toothed belt 102 is regulated with these teeth 114. The tooth side holder 148 has a function of preventing, in coordination with the non-tooth-side holder 154, any rotating with respect to the toothed belt 102. In other words, the tooth-side holder 148 is not substantially misaligned with respect to a longitudinal direction of the toothed belt 102.

The tooth-side holder 148 is formed in a cross-sectional trapezoidal shape by a front-side holding surface 168, which is tilted at approximately the same angle as that of the back tooth face 122B of the front tooth 114F as shown in FIG. 5. The back-side holding surface 172 is tilted at approximately the same angle as that of the front tooth face 122F of the back tooth 114B, and a tooth-side top face 174 connects the respective tips. Specifically, extension lines of the front-side holding surface 168 and the back-side holding surface 172 cross to form an angle slightly smaller than an angle formed by extension lines of the back tooth face 122B of the front tooth 114F and the front tooth face 122F of the back tooth 114B. This arrangement is to allow winding around a toothed pulley 216, which will be described further below.

While a tooth-side back surface 176 facing the tooth-side top face 174 is shown formed in an arc shape in a first embodiment, this can be alternatively flatly formed. In other words, the tooth-side holder 148 is formed in the same shape so as to fit in the pulley tooth receiving groove 136. Therefore, when the pusher 104 is mounted on the toothed belt 102, the tooth-side holder 148 is integrated with the front tooth 114F and the back tooth 114B to form one pusher tooth 180 larger than the tooth 114. The pusher tooth 180 has a tooth length (a length in a longitudinal direction of the toothed belt 102) approximately three times larger than that of the normal tooth 114, and has a tooth height equal to or higher than that of the normal tooth 114.

Also, the tooth-side holder 148 is formed so that its thickness (in FIG. 5, a length in a vertical direction) has a Young's modulus so that the tooth-side holder 148 is not substantially deformed in a longitudinal direction. Specifically, as depicted in FIG. 5, the tooth-side back surface 176 is formed in an arc shape so as to have a thickness thicker than the height of the tooth 114. This is because an increase in height can improve the Young's modulus if the pitch of the teeth 114, the Young's modulus, and the material are taken into consideration.

Figure 4:
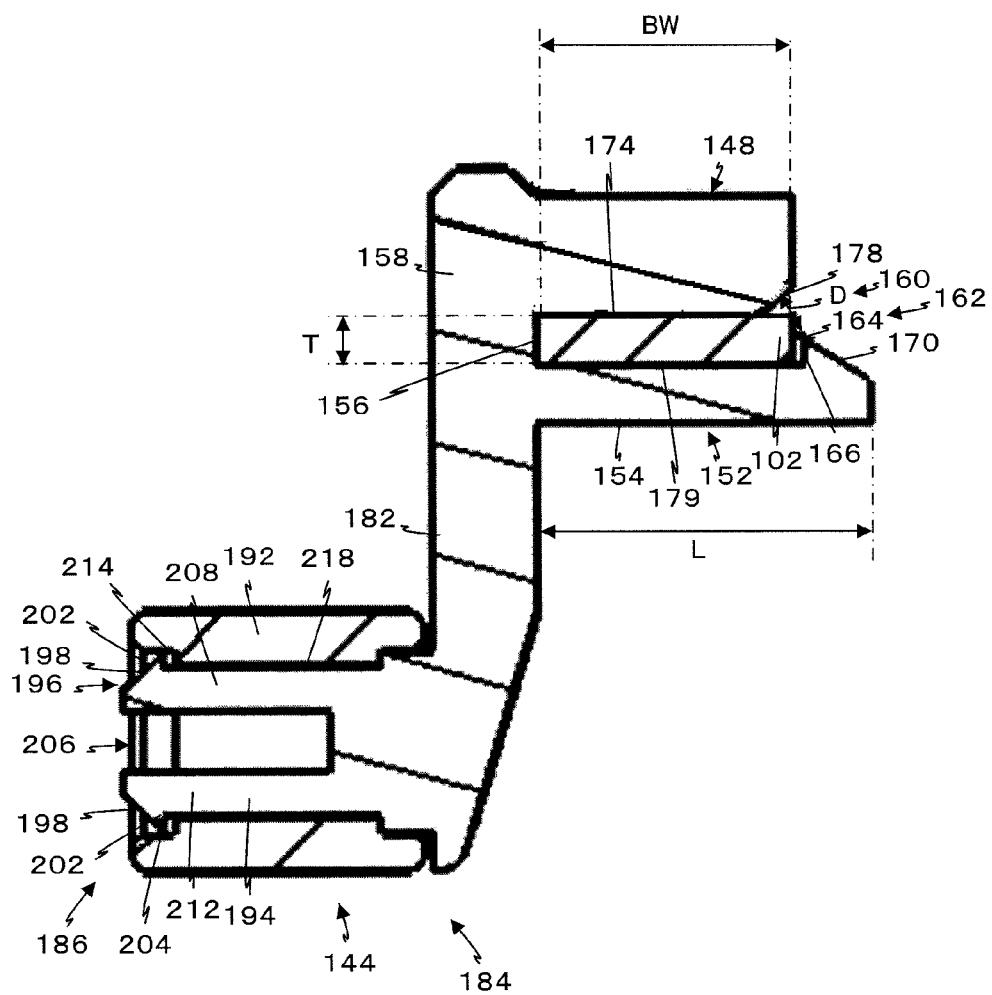
FIG. 4 is an A-A line sectional view in FIG. 1.

Furthermore, as depicted in FIG. 4, the tooth-side holder 148 is formed so as to have a length equal to the width of the toothed belt 102. This is because even if the length of the tooth-side holder 148 is longer than the width of the belt 102, there is no favorable influence on the holding force of the pusher 104 and restrictions on design are increased instead.

Therefore, if the tooth-side holder 148 is inserted into (fits in) the pulley tooth receiving groove 136, the front-side holding surface 168 comes closer to the back tooth face 122B and the back-side holding surface 172 comes closer to the front tooth face 122F, and the tooth-side top face 174 is arranged to be closer to the bottom surface 134. Therefore, the tooth-side holder 148 is not displaced with respect to the toothed belt 102 in its extending direction.

Note that since the toothed belt 102 is in an arc shape, at a portion where the toothed pulley 216 is wound around a pulley shaft, the front tooth face 122F and the back tooth face 122B are formed so as to be in intimate contact with the front-side holding surface 168 and the back-side holding surface 172, respectively.

Also, corners of the tooth-side holder 148 on a toothed belt 102 side are beveled to form a first inclined surface 178. This is to facilitate insertion of the tooth-side holder 148 and the non-tooth-side holder 154 onto the belt 102.

Next, a non-tooth-side holder 154 is described. The non-tooth-side holder 154 has a function of mounting the pushing part 144 together with the tooth-side holder 148 onto the toothed belt 102 so that they do not rotate. The non-tooth-side holder 154 is formed, in parallel to the tooth-side top face 174, on a nipper plane 179 capable of being in surface contact with the flat back surface 118 of the toothed belt 102 on the non-tooth side 152 and, furthermore, is formed so as not be substantially deformed. The non-tooth-side holder 154 has a width W formed to be approximately twice as large as the tooth-side top face 174. This is because, while the width W is preferably wider for preventing the pusher 104 from falling toward the toothed belt 102, if the width is too long in consideration with a curve at the toothed pulley 216, this may work disadvantageously.

The non-tooth-side holder 154 has a length L formed longer than the width of the toothed belt 102 to accommodate the formation of the hook 166. The hook 166 has a right-angled short surface formed toward the tooth-side holder 148 so as to form a right angle with respect to the nipper plane 179. The hook 166 preferably has a height approximately half of the thickness of the belt portion 128. This is because inserting into the belt 102 is difficult if the height is too high and the engagement is insufficient if the height is too low.

A space between the hook 166 and the connector 158 is set to be equal to or slightly larger than a width BW of the belt 102. This is to facilitate engagement of the hook 166 with the other side end edge 164 of the toothed belt 102 and prevent easy detachment. The non-tooth-side holder 154 has a tip preferably formed on a second inclined surface 170. This is to facilitate insertion of the toothed belt 102.

Next, the connector 158 is described. The connector 158 has a function of connecting the tooth-side holder 148 and the non-tooth-side holder 154 at a base end so that these holders are arranged in parallel to each other with a predetermined distance away from each other. The tooth-side holder 148 and the non-tooth-side holder 154 are arranged in parallel with a length corresponding to a thickness T of the belt 102 away from each other. The connector 158 is also formed so as not to be substantially deformed in order to keep parallelism between the tooth-side holder 148 and the non-tooth-side holder 154.

Specifically, a space between the tooth-side holder 148 and the non-tooth-side holder 154 is formed so as to be equal to or slightly larger than a thickness T1 of the belt portion 128 of the toothed belt 102. When the connector 158 is integrally formed of resin together with the tooth-side holder 148 and the non-tooth-side holder 154, the connector 158 becomes slightly in the shape of an arc due to cooling after molding to be deformed so that the tips of the tooth-side holder 148 and the non-tooth-side holder 154 come close to each other. Therefore, in consideration of ease of mounting on the toothed belt 102, it is preferable that the space between the tooth-side holder 148 and the non-tooth-side holder 154 is slightly larger than the thickness T1.

Therefore, the tooth-side holder 148 and the non-tooth-side holder 154 are cantilevered and have their base ends connected via the connector 158, thereby forming a shape of a channel between the holders 146, 154 in a side view. In other words, with respect to the toothed belt 102, the tooth-side holder 148 is positioned on the tooth side 146, the non-tooth-side holder 154 is positioned on the non-tooth side 152, and the connector 158 is positioned on the one side-edge side 156 of the toothed belt 102.

Also, an insertion opening 160 of a space larger than the thickness T of the toothed belt 102 is formed between the tips of the tooth-side holder 148 and the non-tooth-side holder 154. In detail, the tips of the first inclined surface 178 and the hook 166 are formed so as to be a distance D away from each other, the distance being larger than the thickness T of the toothed belt 102. Therefore, the toothed belt 102 can have its belt portion 128 inserted from the insertion opening 160 to the space between the tooth-side holder 148 and the non-tooth-side holder 154.

Next, the pushing part unit 144 is described. The pushing part unit 144 has a function of pushing the article 106. The pushing part unit 144 includes a connecting body part 182 and a pushing part 184 formed contiguously to the connector 158.

The connecting body part 182 is described. The connecting body part 182 is formed contiguously to the connector 158 and has a function of supporting the pushing part 184. In the first embodiment, the connecting part 182 is formed in a flat plate shape together with the connector 158 and is integrally formed of resin. The connecting body part 182 is also configured so as not to be substantially deformed when pushing the article 106.

Next, the pushing part 184 is described. The pushing part 184 has a function of pushing the article 106, such as a coin on a support surface. In other words, a function of making contact with and pushing the article 106. In a first embodiment, the pushing part 184 is a portion extending in parallel to and in reverse to the mount part 142. In other words, the mount part 132, the connector 158, the connecting body part 182, and the pushing part 184 are formed in the shape of a crank as a whole. Therefore, although the pushing part 184 may be a fixed body, the pushing part 184 is configured so as to be rotatably by a roller device 186 in the first embodiment.

Next, the roller device 186 is described. The roller device 186 includes a split shaft 188 and a roller 192, shown in FIG. 3(A) and FIG. 3(B). The shaft 188 is described first. A shaft body 194, in the shape of a column as a whole, is formed and projects a predetermined length in a right angle direction with respect to the connecting body part 182. A free-end tip 196 of the shaft body 194 is formed in the shape of a coned tip inclined surface 198, and its oblique end 202 is formed so as to have a diameter larger than that of the shaft body 194, thereby forming an engaging part 204 that forms a right angle with the shaft body 194.

The shaft body 194 has a slot 206 having a predetermined width from the tip toward a shaft base end, and is configured so that the diameter of the tip of the shaft body 194 can be reduced, where the hollow roller 192 is fitted on the shaft body 194. The shaft body 194 is divided by the slot 206 into a first shaft part 208 and a second shaft part 212, and their tips can be elastically deformed when an external force is applied and can be substantially deformed to have a diameter substantially smaller than the outer diameter of the shaft body 194.

The roller 192 is in a cylindrical shape, and can be made of metal. The roller 192 has an edge inner surface on which a step part 214 is formed, and has a center part in which a bearing hole 218 is bored.

With this structure, the tips of the first shaft part 208 and the second shaft part 212 can be elastically deformed so as to come closer to each other to reduce the outside diameter. Accordingly, the first shaft part 208 and second shaft part 212 can be inserted into a bearing hole 218 of the roller 192 to bring the roller 192 into a snap fitting with the shaft body 194. With this fitting, if deformation of the first shaft part 208 and the second shaft part 212 is released, the first shaft part 208 and the second shaft part 212 return to be in the original state, and the outer diameter of the shaft body 194 becomes normal. With this arrangement, the step part 214 of the roller 192 can contact the engaging part 204 fitting in the shaft 188 and engage with the step part 214 in the roller 192 so that the roller 192 is thereby rotatably supported on the shaft body 194 and will not fall off.

When the pusher 104 is mounted on the belt 102, the tooth-side holder 148 is positioned to face the pulley tooth receiving groove 136 between adjacent teeth 114, and the non-tooth-side holder 154 is pushed to hold the belt portion 128. The back surface 118 is brought into contact with the holder so that the one side-edge part 156 of the toothed belt 102 abuts on the connector 158. Accordingly, the hook 166 engages with the other side end edge 164 of the toothed belt 102, thereby preventing any falling off.

In the first embodiment, a plurality of pushers 104 are mounted on the toothed belt 102, by using the above-described mounting method at predetermined positions so as to be mounted with predetermined pitches.

When the pusher 104 is to be replaced, a force can be applied so that the tips of the tooth-side holder 148 and the non-tooth-side holder 154 are separated from each other to result in a deformation of the connector 158, thereby permitting removal of the pusher 104 by releasing an engagement of the hook 166 with the other side end edge 164 of the toothed belt 102. Then, a new pusher 104 can be mounted by using a procedure similar to that described above.

Next, the toothed pulley 216 around which the article conveyor belt 100 is wound is described mainly with reference to FIG. 6 to FIG. 9. The toothed pulley 216 is in a disc shape, and has at least a pulley bearing hole 220 for mounting on a rotating shaft or a fixed shaft and a pulley teeth part 222 engaging with the teeth 114 of the toothed belt 102. In the present embodiment, the toothed pulley 216 further includes, on at least one side, a belt holding plate 224 in a notched circular plate configuration shown in FIG. 7.

First, the pulley bearing hole 220 is described. In the pulley bearing hole 220, the rotating shaft (not shown) is inserted and fixed to the toothed pulley 216 when the toothed pulley 216 is used as a drive pulley, and is alternatively rotatably mounted on the fixed shaft via a bearing when the toothed pulley 216 is used as a driven pulley.

Next, the pulley teeth part 222 is described. The pulley teeth part 222 has a function of engaging with the teeth 114 of the toothed belt 102 to transmit a driving force.

In the present embodiment, the pulley teeth part 222 is configured of normal teeth parts 226 formed with predetermined first pitches and a special tooth part 228 interposed between the normal teeth parts 226 and formed with a predetermined second pitches. The normal teeth part 226 is configured of pulley teeth 232 closely engaging with the teeth 114 of the toothed belt 102, and a predetermined number of pulley teeth 232 are contiguously formed. In the first embodiment, four contiguous pulley teeth 232 are formed with the first predetermined pitches. The predetermined number of teeth are contiguously formed in order to transmit a predetermined driving force to the toothed belt 102.

Figure 7:
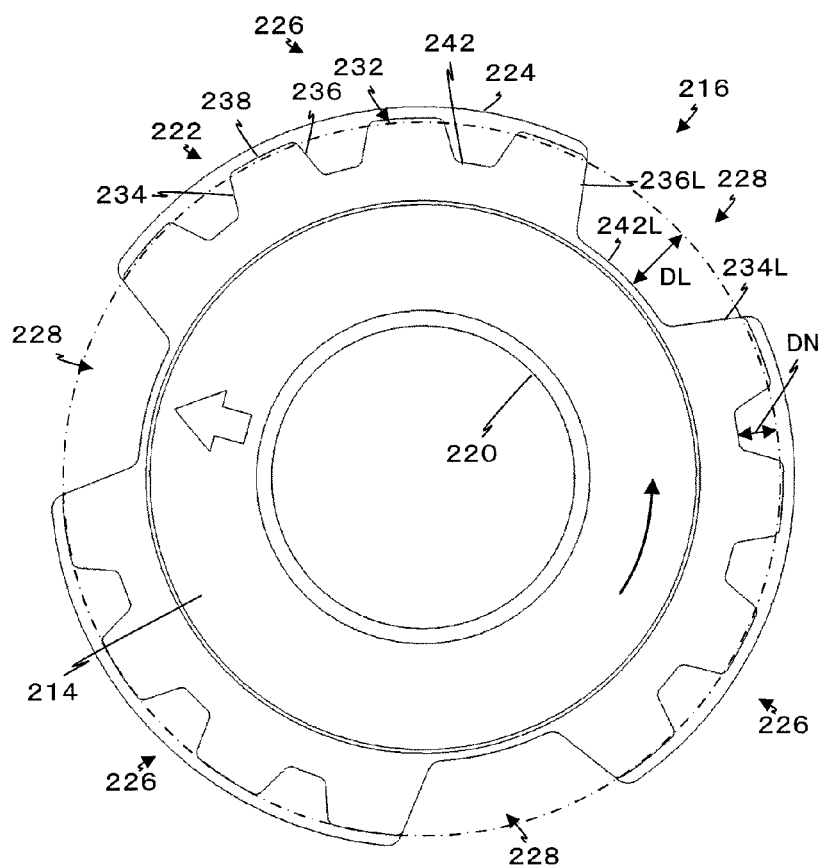
FIG. 7 is a front view of the toothed belt for the article conveyor belt of the first embodiment according to the present invention.
Figure 8:
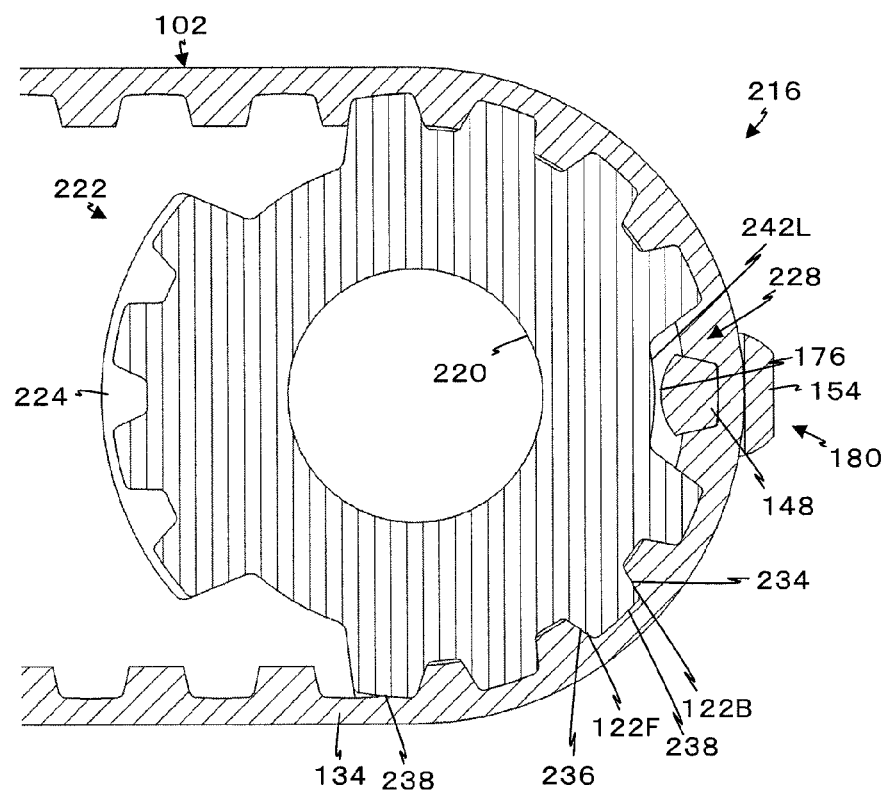
FIG. 8 is a longitudinal sectional view of the article conveyor belt of the first embodiment according to the present invention being wound around the toothed pulley.
Figure 9:
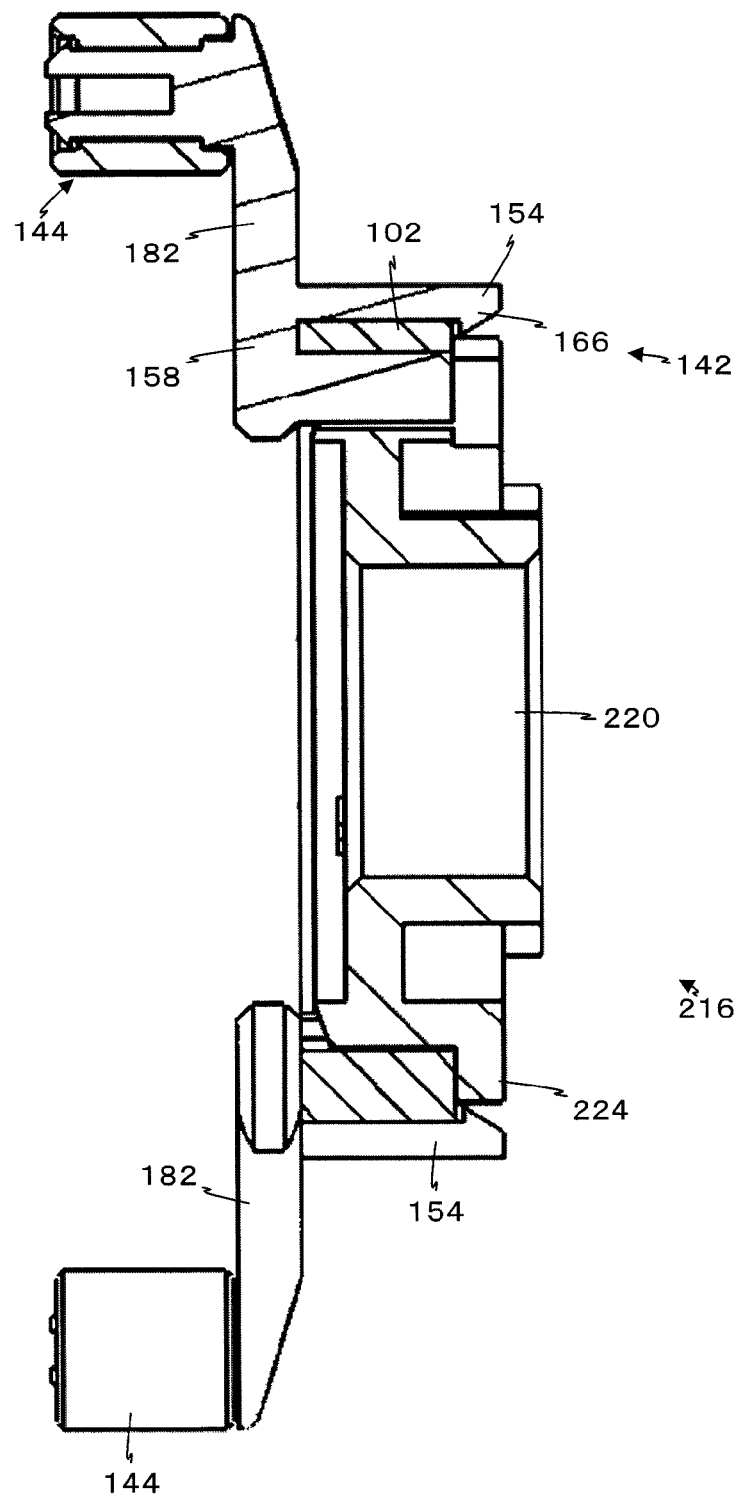
FIG. 9 is a D-D shear cross-sectional view in FIG. 1.

The pulley teeth 232 are formed of an anterior tooth surface 234 and a posterior tooth surface 236 in a rotating direction when the toothed pulley rotates in a counterclockwise direction in FIG. 7, and an arc-shaped top face 238 connecting these surfaces, and a bottom surface 242. Therefore, in a portion where the toothed belt 102 is wound around the toothed pulley 216, the anterior tooth surface 234 is in contact with the back tooth face 122B of the toothed belt 102, the posterior tooth surface 236 is in contact with the front tooth face 122F thereof, and the top face 238 is in contact with the bottom surface 134. With the back tooth face 122B being pushed by the anterior tooth surface 234, a driving force is transmitted to the toothed belt 102.

The special tooth part 228 is formed so as to receive the pusher tooth 180. Specifically, one of normal pulley teeth 232 is deleted, and the special tooth part has a depth DL formed so as to be deeper than a normal depth DN. In other words, the special tooth part 228, which has a trapezoidal space, is formed of an anterior tooth surface 234L of the special tooth part formed by engraving to a bottom 242 side from the anterior tooth surface 234, a posterior tooth surface 236L of the special tooth part formed by engraving to the bottom 242 side from the posterior tooth surface 236, and a special-tooth-part bottom surface 242L.

Therefore, the back tooth face 122B of the toothed belt 102 is pushed by the special-tooth-part anterior tooth surface 234L of the toothed pulley 216 to transmit a driving force. The special tooth parts 228 are formed with pitches that are equal to or a submultiple of pitches of the pushers 104 mounted on the toothed belt 102. This is because the pusher tooth 180 will face the special tooth part 228. The toothed belt 102 is wound around the toothed pulley 216 so that the pusher 180 is positioned at the special tooth part 228 and normal teeth 114 engage with normal teeth part 226.

Next, the belt holding plate 224 is described. The belt holding plate 224 has a function of guiding so that the toothed belt 102 is not removed during operation from the pulley 216. Therefore, the belt holding plate 224 is not required to be provided when there is no possibility for the toothed belt 102 to fall off from the toothed pulley 216.

While the belt holding plate 224 is arranged in a ring shape on the outer perimeter of the pulley tooth 232 on a side positioned below the tooth belt 102 because the toothed pulley 216 rotates about a tilted axial line in the first embodiment, it is preferred that belts holding plates 224 are arranged on both sides when the toothed pulley 216 rotates about a horizontal axial line.

The article conveyor belt 100 according to the first embodiment is provided so as to be stretched between the paired toothed pulleys 216 with either one of the toothed pulleys 216 being set as a drive pulley and the other being set as a driven pulley. An article 106 is pushed by the pushers 104, therefore, the pushing part 144, specifically the roller 192, associated with the movement of the toothed belt 102 to be conveyed in a predetermined direction. Note that the article 106 is guided by a guide rail (not shown) to be conveyed to the predetermined direction.

Second Embodiment

Next, a second embodiment is described with reference to FIG. 10 and FIG. 11. The second embodiment is an example in which an article conveyor belt 100 according to the first embodiment is used as a coin conveyor belt 246 in a coin sorting device 244 and, specifically, is an example in which a chain 232, shown for example in Japanese Unexamined Patent Application Publication No. 2007-114978, is replaced by the article conveyor belt 100.

The coin sorting device 244 has a function of sorting coin 248 conveyed by the coin conveyor belt 246 into denomination sorting units, and includes the coin conveyor belt 246, a guide rail 252, and denomination sorting units 254. The coin conveyor belt 246 is provided so as to be stretched as being wound around paired toothed pulleys 216, circulating through a flat oval route. Therefore, the pushers 104 also circulate through a flat oval route.

Next, a guide rail 252 is described. The guide rail 252 has a function of guiding a lower peripheral surface 256 and a lower surface 258 of each coin 248 pushed by the coin conveyor belt 246, and includes a peripheral-surface guide rail 262 at a right angle guiding the lower peripheral surface 256 and a lower-surface guide rail 264 guiding the lower surface 258. Therefore, a coin 248 pushed by the pushers 104 are linearly conveyed through the denomination sorting units 254 with the lower surface 258 being guided by the lower-surface guide rail 264 tilted at approximately 45 degrees with respect to the horizontal line and the lower peripheral surface 256 being guided by the peripheral-surface guide rail 262.

The peripheral-surface guide rail 262 has a function of guiding the peripheral surface of the coin 248 for movement through the denomination sorting units 254 and, in the second embodiment, is formed as a rail having a narrow width and forming a right angle with respect to the lower-surface guide rail 264 as a whole. Specifically, the peripheral-surface guide rail 262 is formed to have a right angle by mobile peripheral-surface guide rails 268 each arranged between fixed peripheral-surface guide rails 266 arranged with predetermined pitches. However, when the denomination sorting units 254 are each arranged only on the lower-surface guide rail 264, the peripheral-surface guide rail 262 can be configured only of the fixed peripheral-surface guide rail 266.

The mobile peripheral-surface guide rails 268 are each provided so as to be able to jut and sink from the lower-surface guide rail 264. When positioned at a peripheral-surface guide position PGP as jutting upward from the lower-surface guide rail 264, the mobile peripheral-surface guide rail 268 configures the peripheral-surface guide rail 262 at the right angle together with the fixed peripheral surface guide rail 266. When positioned at a non-guide position as moving downward from the lower-surface guide rail 264, the mobile peripheral-surface guide rail 268 does not configure the peripheral-surface guide rail 262 but is configured as a first coin falling port 272, which can serve one or more denomination sorting units 254.

Figure 10:
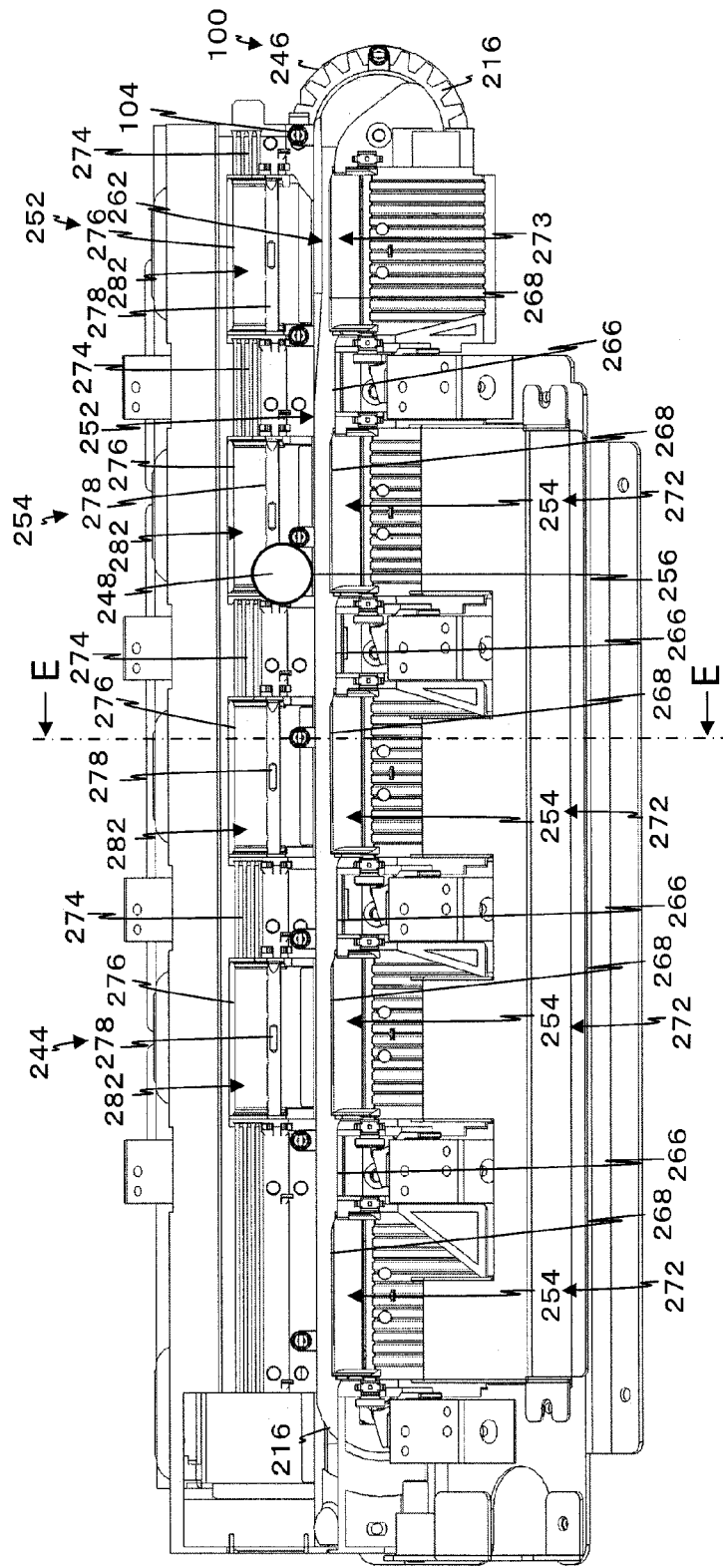
FIG. 10 is a front view of a coin sorting device of a second embodiment according to the present invention.
Figure 11:
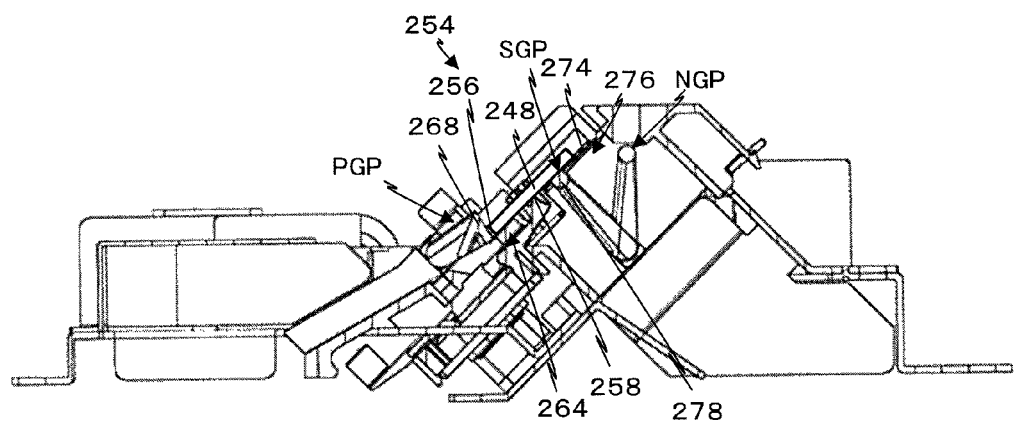
FIG. 11 is an E-E shear sectional view in FIG. 10.

While five mobile peripheral-surface guide rails 268 are arranged in FIG. 10, since the mobile peripheral-surface guide rail 268 at the right end is the return falling port 273 for return, and therefore four mobile peripheral-surface guide rails 268 from the left end configure the first coin falling ports 272, which are the denomination sorting units 254 for four denominations.

The lower-surface guide rail 264 has a function of guiding the lower surface 258 of the coin 248 for movement through the denomination sorting units 254 and, in the second embodiment, is formed as a flat surface tilted at 45 degrees with respect to the horizontal line as a whole. Specifically, the lower-surface guide rail 264 substantially forms a tilted flat surface by a mobile lower-surface guide rail 278 arranged on a second coin falling port 276 between the fixed lower-surface guide rails 274 arranged with the predetermined pitches. However, when the denomination sorting unit 254 is arranged only on the peripheral-surface guide rail 262, the lower-surface guide rail 264 can be configured only of the fixed lower-surface guide rail 274.

The mobile lower-surface guide rails 278 are each provided so as to be able to jut and sink from the lower-surface guide rail 264. When positioned at a guide position SGP flush with the lower-surface guide rail 264, the mobile lower-surface guide rail 278 configures the lower-surface guide rail 264, as shown in FIG. 11. When positioned at a non-guide position NGP as moving downward from the lower-surface guide rail 264, the mobile lower-surface guide rail 278 does not configure the lower-surface guide rail 264 but configures a second coin falling port 276, which is for one denomination sorting unit 254.

In the second embodiment, four mobile lower-surface guide rails 278 are arranged so as to be in series in a vertical direction with respect to the mobile peripheral-surface guide rails 268. In other words, when the mobile peripheral-surface guide rail 268 at one position is configured to be a non-guide position, the coin 248 slides diagonally downward to be sorted to the first coin falling port 272. When the mobile lower-surface guide rail 278 moves to the non-guide position NGP, the coin 248 falls straight down to be sorted to the second coin falling port 276.

In the second embodiment, the coins 248 of eight denominations, that is, two euro, one euro, 50 cents, 20 cents, 10 cents, 5 cents, 2 cents, and 1 cent of euro coins, are sorted, and therefore the first coin falling ports 272 and the second coin falling ports 276, which are eight denomination sorting units 254, are each set so that coins 248 of a predetermined denomination is sorted (falls down).

Next, the operation of the coin sorting device 244 of the second embodiment is described. The coins 248 are separated by the previous process and are passed over to the coin sorting device 244. In the coin sorting device 244, the coin 248 is pushed by the pushers 104, therefore the pushing part 184, in detail the roller 192, to proceed through the coin sorting unit 254 with its lower surface 258 being guided by the lower-surface guide rails 264 (the fixed lower-surface guide rail 274 and the mobile lower-surface guide rail 278) and the lower peripheral surface 256 being guided by the peripheral-surface guide rails 262 (the fixed peripheral-surface guide rail 266 and the mobile peripheral-surface guide rail 268).

Then, when a predetermined mobile peripheral-surface guide rail 268 moves to the non-guide position, the lower peripheral surface 256 is not supported by the mobile peripheral-surface guide rail 268, and therefore the coin 248, falls down under its own weight to the first coin falling port 272 at a portion where the mobile peripheral-surface guide rail 268 moving to the non-guide position has been positioned to be sorted to a predetermined denomination.

When the mobile lower-surface guide rail 278 moves to the non-guide position NGP, the lower surface 258 is not supported by the mobile lower-surface guide rail 278, and therefore the coin 248, falls down under its own weight to the second coin falling port 276 at a portion where the mobile peripheral-surface guide rail 268 moving to the non-guide position NGP has been positioned to be sorted to a predetermined denomination.

DESCRIPTION OF REFERENCE CHARACTERS 100 article conveyor belt
102 toothed belt
104 pusher
106 article
108 ring-shaped belt
112 inner surface side
114 tooth
116 outer surface side
118 flat back surface
122 tooth face
128 belt portion 132 top face
134 bottom surface
136 pulley tooth receiving groove
142 mount part
144 pushing part unit
146 tooth side
148 tooth-side holder
152 non-tooth side
154 non-tooth-side holder
156 one side-edge side
158 connector
160 insertion opening
162 non-connector side
164 side end edge
166 hook
168 front-side holding surface
170 second inclined surface
172 back-side holding surface
174 tooth-side top face
176 tooth-side back surface
178 first inclined surface
179 nipper plane
180 pusher tooth
182 connecting body part
184 pushing part
186 roller device
188 split shaft
192 hollow roller
194 shaft body
196 free-end tip
198 coned tip inclined surface
202 oblique end
204 engaging part
206 slot
208 first shaft part
212 second shaft part
214 step part
216 paired toothed pulley
218 bearing hole
220 pulley bearing hole
222 pulley teeth part
224 belt holding plate
226 normal teeth parts
228 special tooth part
232 pulley teeth
232 chain (same # as pulley teeth)
234 anterior tooth surface
236 posterior tooth surface
238 arc-shaped top face
242 bottom surface
244 coin sorting device
246 coin conveyor belt
248 sorting cone
252 guide rail
254 denomination sorting units
256 lower peripheral surface
258 lower surface of coin
262 peripheral-surface guide rail
264 lower-surface guide rail
266 fixed peripheral-surface guide rails
268 mobile peripheral-surface guide rails
272 first coin falling port
273 return falling port
274 fixed lower-surface guide rails
276 second coin falling port
278 mobile lower-surface guide rail Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. An article conveyor belt assembly in which an article is pushed by pushers removably mounted on a toothed belt having teeth for transmission of motive power with predetermined pitches, comprising:
   the pushers each having a mount part for mounting on the toothed belt and a pushing part, for the article, formed on the mount part, wherein the mount part is positioned on a tooth side holder of the toothed belt and a non-tooth-side holder is positioned on a non-tooth side; and
   a connecter connecting the mount part on one side-edge side of the toothed belt, and having a hook formed at a tip of at least the tooth-side holder or the non-tooth-side holder to engage with an end edge on a non-connecter side of the toothed belt, wherein
   the pushers each have a pushing part unit integrally formed with the mount part including a first cantilevered shaft and a second cantilevered shaft spaced from each other, and a hollow roller configured to snap mount for capturing the respective first cantilevered shaft and the second cantilevered shaft.

2. The article conveyor belt assembly according to claim 1, wherein
   a tooth-side holder is formed in a trapezoidal shape for approximately fitting in a trapezoidal pulley tooth receiving groove between the teeth formed at the predetermined pitches, and
   the non-tooth-side holder is formed as a flat surface in close contact with a back surface of the toothed belt.

3. The article conveyor belt assembly according to claim 1 wherein
   the mount part includes a cantilevered tooth side holder and a cantilevered non-tooth side holder with a space separating the tooth side holder and the non-tooth side holder configured to receive a thickness of the toothed belt, the mount part is configured of a material flexible enough to enable the tooth belt to deform a position of the hook for mounting and removing the pusher.

4. The article conveyor belt assembly according to claim 1 wherein
   a connector body part is integrally connected at a first end to the mount part on a first side of the connector body part and the connector body part is integrally connected at a second end to the pushing part unit which is on a second side of the connector body part opposite to the first side of the connector body part.

5. An article conveyor belt assembly in which an article is pushed by pushers integrally provided on a toothed belt having teeth for transmission of motive power with predetermined pitches, comprising:
   the pushers each having a mount part for mounting on the toothed belt and a pushing part for the article formed on the mount part, wherein the mount part being formed in a gate shape by a tooth-side holder is positioned on a tooth side of the toothed belt and a non-tooth side holder is positioned on a non-tooth side; and
   a connecter connecting the mount part on one side-edge side of the toothed belt, and having a hook formed at a tip of at least the tooth side holder or the non-tooth side holder to engage with an end edge on a non-connecter side of the toothed belt, wherein the mount part includes a cantilevered tooth side holder and a cantilevered non-tooth side holder with a space separating the tooth side holder and the non-tooth side holder configured to receive a thickness of the toothed belt, the mount part is configured of a material flexible enough to enable the tooth belt to deform a position of the hook for mounting and removing the pusher, wherein a hollow roller is configured to snap mount on a shaft body of the pushing part.

6. The article conveyor belt assembly of claim 5 wherein the shaft body is split into a first shaft part and a second shaft part that are configured to elastically deform to mount the hollow roller.

7. An article conveyor belt assembly in which an article is pushed by pushers removably mounted on a toothed belt having teeth for transmission of motive power with predetermined pitches, comprising:

the pushers each having a mount part for mounting on the toothed belt and a pushing part for the article formed on the mount part, wherein the mount part is positioned on a tooth side of the toothed belt and a non-tooth-side holder is positioned on a non-tooth side; and a connector connecting the mount part on one side-edge of the toothed belt, and having a hook formed at a tip of at least the tooth-side holder or the non-tooth-side holder to engage with an end edge on a non-connecter side of the toothed belt, wherein the pushing part is configured to be integrally connected to the mount part and includes a first cantilevered shaft and a second cantilevered shaft spaced from each other, and a hollow roller configured to snap mount for capturing the respective first cantilevered shaft and the second cantilevered shaft for contacting the article.

* * * * *